United States Patent
Jones et al.

(10) Patent No.: US 11,970,656 B2
(45) Date of Patent: Apr. 30, 2024

(54) IN-SITU SWELLING POLYMER FOR WELLBORE BARRIER

(71) Applicant: Halliburton Energy Services, Inc., Houston, TX (US)

(72) Inventors: Paul J. Jones, Houston, TX (US); William Cecil Pearl, Jr., Spring, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/508,771

(22) Filed: Oct. 22, 2021

(65) Prior Publication Data

US 2023/0129038 A1    Apr. 27, 2023

(51) Int. Cl.
*E21B 33/14* (2006.01)
*C09K 8/42* (2006.01)
*C09K 8/44* (2006.01)
*C09K 8/508* (2006.01)

(52) U.S. Cl.
CPC ............ *C09K 8/5083* (2013.01); *C09K 8/428* (2013.01); *C09K 8/44* (2013.01); *E21B 33/14* (2013.01)

(58) Field of Classification Search
CPC ........ C09K 8/5083; C09K 8/428; C09K 8/44; E21B 33/14
See application file for complete search history.

(56) References Cited

U.S. PATENT DOCUMENTS

| | | | |
|---|---|---|---|
| 2008/0135250 A1* | 6/2008 | Bosma | C04B 28/02 166/285 |
| 2010/0038086 A1* | 2/2010 | Bunnell | C09K 8/80 166/308.2 |
| 2010/0163252 A1* | 7/2010 | Regnault De La Mothe | C09K 8/422 166/387 |
| 2014/0049823 A1* | 2/2014 | Grubbs | H10K 85/143 526/194 |
| 2015/0167424 A1* | 6/2015 | Richards | E21B 34/14 166/386 |
| 2016/0312112 A1* | 10/2016 | Ogle | E21B 43/267 |
| 2017/0247296 A1* | 8/2017 | Salla | C04B 26/02 |
| 2018/0274326 A1* | 9/2018 | Nedwed | E21B 33/06 |
| 2018/0305996 A1 | 10/2018 | Duan et al. | |

(Continued)

FOREIGN PATENT DOCUMENTS

| | | |
|---|---|---|
| EP | 0737694 A1 | 10/1996 |
| WO | 2016089938 A1 | 6/2016 |
| WO | 2020204940 A1 | 10/2020 |

OTHER PUBLICATIONS

Unpublished International Patent Application No. PCT/US2020/066296, filed Dec. 21, 2020—stored in USPTO.

(Continued)

*Primary Examiner* — Silvana C Runyan
(74) *Attorney, Agent, or Firm* — Kilpatrick Townsend & Stockton LLP

(57) ABSTRACT

A device for forming one or more wellbore sealants in a wellbore can include a wellbore barrier and a cured polymer. The wellbore barrier can be positioned in the wellbore. The cured polymer can be positioned with respect to the wellbore barrier for swelling the device from a compressed configuration to a swelled configuration for forming one or more wellbore sealants in the wellbore.

17 Claims, 9 Drawing Sheets

(56) References Cited

U.S. PATENT DOCUMENTS

2020/0017748 A1* 1/2020 Hu .................... E21B 33/134
2020/0071457 A1 3/2020 Allen et al.

OTHER PUBLICATIONS

Halliburton, "WellLock Resin—Rigless Micro-Channel Remediation", Australia, 2014, 1 page.
International Search Report and Written Opinion, PCT/US2022/046699, dated Feb. 9, 2023, 10 pages.

* cited by examiner

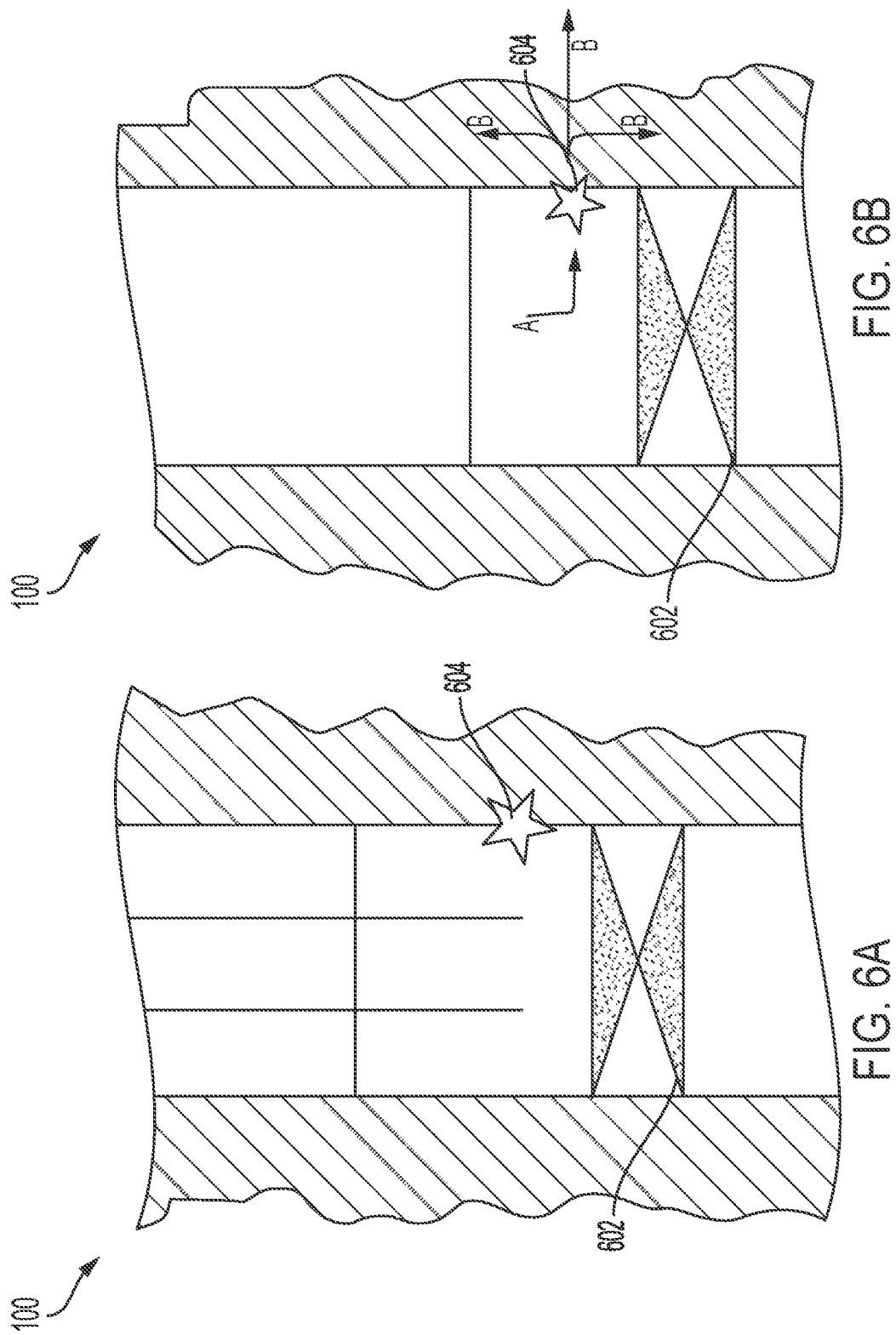

IN-SITU SWELLING POLYMER FOR WELLBORE BARRIER

TECHNICAL FIELD

The present disclosure relates generally to wellbore materials and, more particularly (although not necessarily exclusively), to in-situ swelling polymers usable for barriers in a wellbore.

BACKGROUND

A wellbore can be formed in a subterranean formation for producing hydrocarbons or other formation fluids. Various wellbore operations can be performed with respect to the wellbore, and the various wellbore operations can involve positioning wellbore tools or materials in the wellbore. For example, cement, a packer, or other suitable tool or material can be positioned in the wellbore for use in stimulating the wellbore, producing hydrocarbons from the wellbore, completing the wellbore, or for other suitable purposes. The tools or materials may be positioned in the wellbore for forming one or more seals in the wellbore. The seals may improve the various wellbore operations, but sealants used may not effectively set or cure to form perfect seals. For example, the sealants may experience shrinkage, cracking, or other suitable or related issues when setting or curing in the wellbore.

BRIEF DESCRIPTION OF THE DRAWINGS

FIG. 6A is a diagram of an alternative exemplary placement of a polymer-based sealant composition in a wellbore according to one example of the present disclosure.

FIG. 6B is a diagram of an alternative exemplary placement of a polymer-based sealant composition in a wellbore according to one example of the present disclosure.

DETAILED DESCRIPTION

Figure 1:
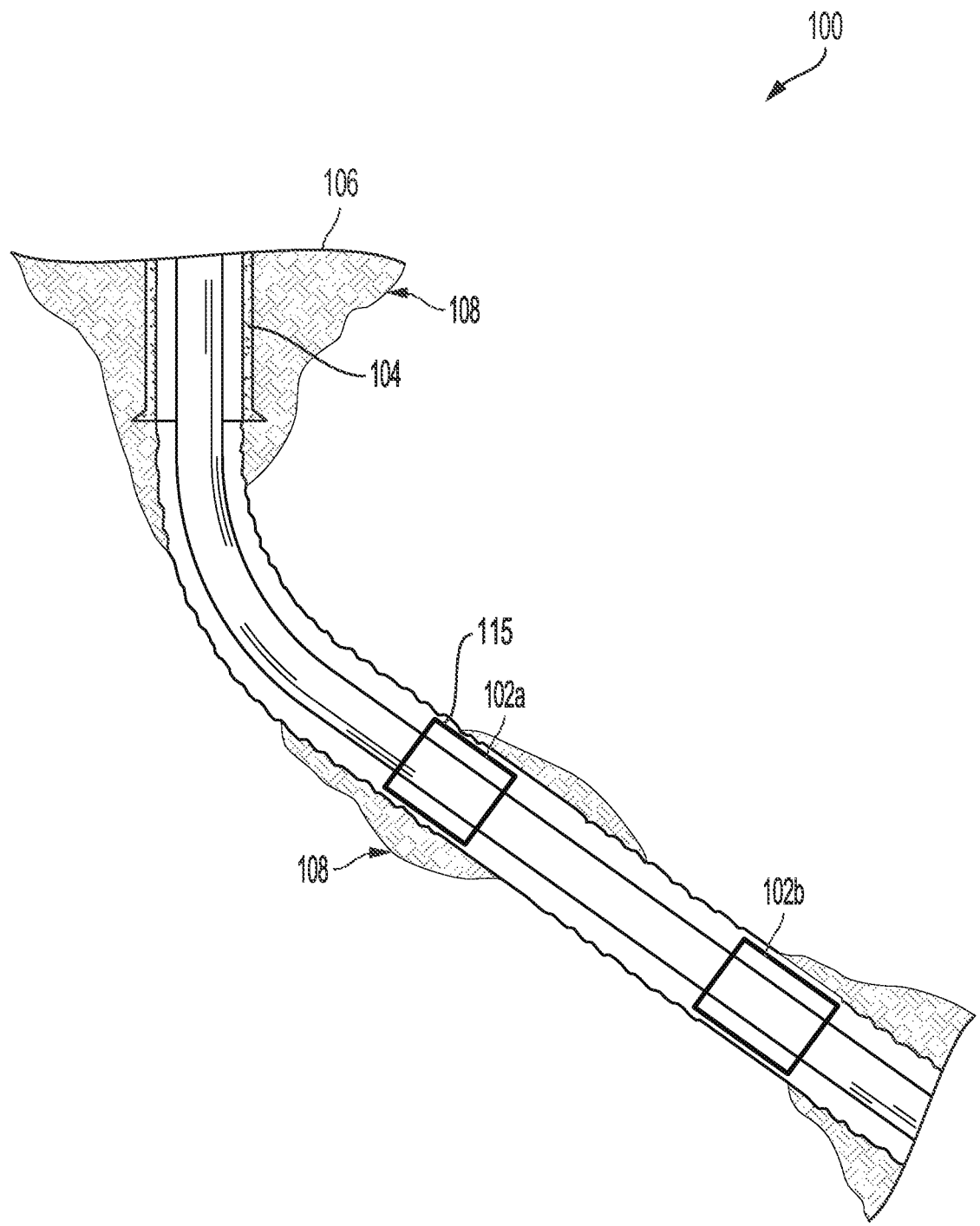
FIG. 1 is a diagram of a wellbore that includes at least one wellbore barrier that can use in-situ polymer swelling for forming sealants in the wellbore according to one example of the present disclosure.

Various challenges can be encountered when using wellbore sealants. For example, the wellbore sealants can encounter shrinkage, cracking, or the like, which may result in imperfect seals being formed. Cement systems and resin systems may shrink during a curing process, which may result in a loss of an ability of the cement systems or resin systems to form a hydraulic seal or a pressure seal. Over time, various events experienced in the wellbore, for example through temperature and pressure cycling, may cause or otherwise lead to cement cracking in the wellbore. A successful well operation with respect to the wellbore may depend on mitigation or elimination of effects relating to shrinkage and cracking in the wellbore.

Shrinkage associated with a sealant cure may be compensated by swelling a cured resin system with an appropriate fluid to restore a relevant seal. Incorporation of swelling materials into a primary cement design can restore wellbore integrity subsequent to becoming compromised. Swelling materials may additionally be attached or otherwise affixed to the casing of the wellbore to function as external casing packers.

Cyclic olefins may undergo ring-opening metathesis polymerization (ROMP) processes in a wellbore or otherwise with respect to the wellbore. The resulting polymer network may exhibit swelling properties in hydrocarbons such as gas, diesel, or other suitable hydrocarbon material. Subsequent to swelling, shrinkage due to one or more curing processes may be offset. When incorporated into a cement slurry or other suitable mixture, the swelling may additionally offset shrinkage or seal cracking associated with the cement slurry.

A small amount of swelling polymer or elastomer may be placed in a wellbore at strategic locations for producing a barrier. The barrier may include zero or essentially zero permeability, porosity, or a combination thereof. The swelling polymer or elastomer may be positioned in the wellbore or otherwise with respect to the wellbore as a liquid (or in other suitable phases) and may be allowed to cure in-situ to form a plug within the casing of the wellbore or swell packer on the exterior of the casing of the wellbore. Subsequent to positioning the swelling polymer or elastomer, a fluid (e.g., a catalyst) can be introduced to swell the polymer or elastomer for forming a seal in the wellbore.

Cyclic olefins, a transition metal compound catalyst, and other suitable swellable components can be pumped or placed into a wellbore. The cyclic olefins, the transition metal compound catalyst, and other swellable components can be positioned in the wellbore as neat fluids, as densified fluids, as or in a cement composite material, or in other suitable compositions and may be allowed to cure (e.g., into a cured polymer) in the wellbore. Subsequent to curing, a hydrocarbon fluid, hydrocarbon-based mud, or other suitable fluid may contact the cured polymer to initiate a swelling process. The cyclic olefin, or other suitable polymer, and transition metal compound catalyst may be mixed at surface, added to cement slurry, pumped down hole in the wellbore and may be allowed to cure. The polymer and catalyst may be cured and ground into a particulate with an appropriate size to be easily incorporated into a dry cement blend prior to mixing. For example, the cyclic olefin, or other suitable polymer, and transition metal compound catalyst may be mixed at surface and allowed to cure into a cured polymer, and may be ground and added to a cement slurry, pumped down hole in the wellbore and may be allowed to cure into a cured composite cement. If a crack develops in the cement that allows hydrocarbon fluids to flow through the crack, the polymer phase of the cured polymer may swell to seal the crack.

In another example, the polymer and catalyst may be mixed at surface, placed in a mold attached to the casing of the wellbore, and may be allowed to cure. When the casing is run in the wellbore, it may optionally be cemented, and the cured polymer may swell when contacted by a hydrocarbon fluid to form a seal in the wellbore. Such a circumstance may occur when or if the cement contracts, creating an annulus between the cement and the casing. In this way, the swelled polymer may be or otherwise function as a secondary barrier to primary cementing.

A resin-based sealant composition may include a resin that can undergo a ring-opening metathesis polymerization (ROMP) reaction. Resin molecules that undergo ROMP may polymerize by forming new carbon-carbon bonds between molecules. Once the polymerization reaction is initiated, the reaction may proceed rapidly to transform the resin-based sealant composition from a liquid to a solid. During the reaction, heat may be released which may raise the temperature of the resin-based sealant composition, however, the heat generated may not be sufficient to char or degrade the final set product. The resin in the resin-based sealant composition may be pumpable below 38° C. (100° F.) without additional solvents present. Further, the resin may have a density greater than water and a viscosity that may be ideal for deep penetration into channels and efficient squeezes for defects such as gas migration or casing leaks.

The resin included in the resin-based sealant composition may include a cycloalkene, which may be a cycloalkadiene, that may undergo a ROMP reaction, transforming the resin-based sealant composition into a hardened mass. The cycloalkene may not include aromatic character. The cycloalkene may include cyclopentadiene, dicyclopentadiene, tricyclopentadiene, cyclobutadiene, cyclohexadiene, terpinene, norbornadiene, isomers thereof, or any combination thereof. The cycloalkene may also be substituted or unsubstituted cycloalkadienes. Substituted cycloalkadienes may be substituted with a hydrocarbyl group or any other suitable organic functional group. The cycloalkene may be present at a point in a range of about 50 wt. % to about 99.5 wt. % of the resin-based sealant composition. Alternatively, the cycloalkene may be present at a point in a range of about 50 wt. % to about 60 wt. %, at a point in a range of about 60 wt. % to about 70 wt. %, at a point in a range of about 70 wt. % to about 80 wt. %, at a point in a range of about 80 wt. % to about 90 wt. %, at a point in a range of about 90 wt. % to about 99.5 wt. %. or any ranges therebetween.

The resin-based sealant composition may include a transition metal compound catalyst where the transition metal compound catalyst may include a substituted or unsubstituted metal carbene compound comprising a transition metal and an organic backbone. Some non-limiting examples of the transition metal compound catalyst may include a Grubbs Catalyst®, Schrock catalysts, or other suitable material. The Grubbs Catalyst® may include ruthenium alkylidene or osmium alkylidene and Schrock catalyst may include molybdenum. Selection of a transition metal compound catalyst may affect the polymerization rate. The transition metal compound catalyst may be present in the resin-based sealant compositions at a point in a range of about 0.001 wt. % to about 20 wt. %. Alternatively, the transition metal compound catalyst may be present at a point in a range of about 0.001 wt. % to about 1 wt. %, at a point in a range of about 1 wt. % to about 5 wt. %, at a point in a range of about 5 wt. % to about 10 wt. %, at a point in a range of about 10 wt. % to about 15 wt. %, at a point in a range of about 15 wt. % to about 20 wt. %, or any ranges therebetween. Alternatively, the resin and the transition metal compound catalyst concentrations may be expressed as a relative mass ratios. For example, the resin and the transition metal compound catalyst may be present in the resin-based sealant composition in a mass ratio of about 50:1 to about 10000:1 resin to transition metal compound catalyst. Alternatively, the resin and transition metal compound catalyst may also be present in mass ratios of about 50:1 to about 100:1, about 100:1 to about 500:1, about 500:1 to about 1000:1, about 1000:1 to about 2000:1, about to 2000:1 to about 3000:1, about 3000:1 to about 4000:1, about 4000:1 to about 5000:1, about 5000:1 to about 6000:1, about 6000:1 to about 7000:1, about 7000:1 to about 8000:1, about 8000:1 to about 9000:1, about 9000:1 to about 10000:1 or any mass ratios therebetween of the resin to the transition metal compound catalyst. Alternatively, the transition metal compound catalyst may be suspended in a mineral oil suspension, or any suitable suspension medium. For example, the suspension medium may be present in the transition metal compound catalyst suspension in an amount of about 90% to 99% of the transition metal compound catalyst suspension. Alternatively, the suspension medium may be present in amount of about 90% to about 92%, about 93% to about 95%, and about 96% to about 99%. The resin and the transition metal compound catalyst suspension concentrations may be expressed as a relative mass ratios. For example, the resin and the transition metal compound catalyst suspension may be present in the resin-based sealant composition in a mass ratio of about 50:1 resin to transition metal compound catalyst suspension. Alternatively, the resin and transition metal compound catalyst suspension may also be present in mass ratios of about 20:1, about 30:1, about 40:1, about 60:1, about 70:1, or about 80:1, or any mass ratios therebetween of the resin to the transition metal compound catalyst suspension. Specific examples of suitable transition metal compound catalysts will be described in detail below.

The transition metal compound catalyst may have the general chemical structure depicted in Structure 1. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may be optionally substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. L and L1 may any suitable neutral electron donor.

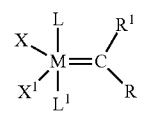

Structure 1

The transition metal compound catalyst may also have the general chemical structure depicted in Structure 2. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 groups may be the same or different and may be any suitable anionic ligand. L2, L3, and L4 may be the same or different, and may be any suitable neutral electron donor ligand, wherein at least one L2, L3, and L4 may be an N-heterocyclic (NHC) carbene ligand as described below.

Structure 2

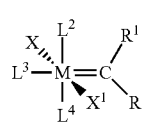

The transition metal compound catalyst may also have the general chemical structure depicted in Structure 3. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

Structure 3

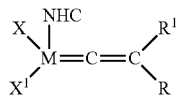

The transition metal compound catalyst may also have the general chemical structure depicted in Structure 4. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

Structure 4

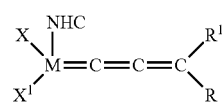

The transition metal compound catalysts of Structures 2-4 may further include an N-heterocyclic carbene (NHC) ligand. The NHC ligands may include 4-membered NHC and 5-membered NHC where the NHC ligand may attach to one coordination site of the transition metal compound catalyst. Structures 5-9 are exemplary structures of NHC ligands.

The NHC ligand may be a 4-membered N-heterocyclic carbene ligand. An exemplary structure of 4-membered carbene ligand is depicted in Structure 5. In the following structure, iPr is an isopropyl group.

Structure 5

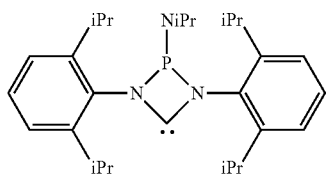

The NHC ligand may also be a 5-membered N-heterocyclic carbene ligand. An exemplary structure of 5-membered carbene ligands is depicted in Structure 6 and Structure 7. R1 and R2 may be independently selected from 2,4,6-(Me)3C6H2, 2,6-(iPr)2C6H3, cyclohexyl, tert-butyl, 1-adamantyl.

Structure 6

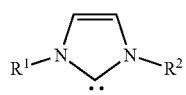

Structure 7

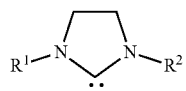

The NHC ligand may be a 5-membered N-heterocyclic carbene ligand.

Another exemplary structure of a 5-membered carbene ligand is depicted in Structure 8. R1 and R2 may be equivalent groups and may be selected from (CH2)n where n may be 4-7 and 12.

Structure 8

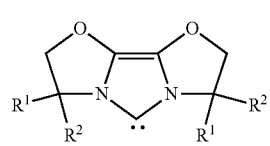

The NHC ligand may be a 5-membered N-heterocyclic carbene ligand. An exemplary structure of 5-membered carbene ligand is depicted in Structure 9. R may be selected between hydrogen and tert-butyl.

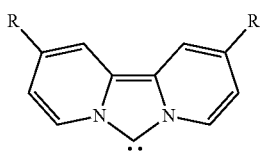

Structure 9

The resin-based sealant may further include solvents. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. Suitable example of solvents may also include but are not limited to hydrocarbon fluids (e.g. base oils, diesel oil, mineral oil, cyclohexane).

The resin-based sealant may further include additional additives. Such additional additives can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The resin-based sealant composition may be prepared in any suitable manner, for example, mixing the resin and transition metal compound catalyst in a mixer and conveyed to a downhole location. The resin-based sealant may be applied during remedial operations to repair casing or any structural degradation along the wellbore. The resin-based sealant composition may be used to form a balance plug in a wellbore. The resin-based sealant composition may be placed in a wellbore to plug voids, such as holes or cracks in the pipe strings; holes, cracks, spaces, or channels in the sheath; and very small spaces (commonly referred to as "micro-annuli") between the sheath and the exterior surface of the pipe or wellbore wall. For example, in subterranean well construction, a conduit (e.g., pipe string, casing, liners, expandable tubulars, etc.) may be run into a well bore and cemented in place. Among other things, the sealant sheath surrounding the pipe string functions to prevent the migration of fluids in the annulus, as well as protecting the pipe string, from corrosion.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a diagram of a wellbore 100 that includes at least one wellbore barrier 102 that can use in-situ polymer swelling for forming seals in the wellbore 100 according to one example of the present disclosure. As illustrated, the wellbore 100 includes two wellbore barriers 102a-b, but any suitable number of wellbore barriers 102 can be included in the wellbore 100. The wellbore barriers 102a-b can include a packer, cement or a cementing slurry, other suitable wellbore barriers, or a combination thereof. The wellbore barriers 102a-b may be positioned downhole in the wellbore 100 for performing one or more wellbore operations with respect to the wellbore 100. For example, the wellbore barriers 102a-b may define pressure-isolated zones, usable for stimulating the wellbore 100 or for other suitable purposes, that are not affected by pressures or pressure changes from other portions of the wellbore 100. Additionally, the wellbore barriers 102a-b may include a cured polymer 115 positioned on an exterior surface of the wellbore barriers 102a-b, positioned within an elastomeric sealing element of the wellbore barriers 102a-b, or dispersed within the wellbore barriers 102a-b. The cured polymer 115 can expand in-situ in response to being exposed to fluid containing hydrocarbon material, such as a formation fluid, a hydrocarbon-based mud, or the like.

The wellbore 100 may include a casing 104 at the surface 106 or in other suitable locations with respect to the wellbore 100. As illustrated, the casing 104 may extend from the surface 106 to a point in the wellbore 100 that is between the surface 106 and the bottom or end of the wellbore 100. Additional casing beyond casing 104 illustrated in FIG. 1 may be used. The wellbore 100 may be formed in a subterranean formation 108 that can include hydrocarbon material such as oil, gas, or other suitable hydrocarbon material. The subterranean formation 108 may include a hydrocarbon reservoir that can include the hydrocarbon material. In some examples, the wellbore 100 can be used to extract produced hydrocarbons from the hydrocarbon reservoir via wellbore-related tasks such as hydraulic fracturing or other suitable stimulation or production operations. The wellbore barriers 102a-b may each form one or more seals in the wellbore 100 for performing the wellbore operations, described above, involving the subterranean formation 108.

The wellbore barriers 102a-b may include or otherwise use a polymer and a catalyst for forming seals in the wellbore 100. The polymer can include cyclic olefin or other suitable polymers or elastomers, and the catalyst can be or otherwise include a transition metal compound or other suitable catalyst. The polymer and the catalyst can set or cure in the wellbore barriers 102a-b, forming a cured polymer and, in the presence of hydrocarbon material or other suitable fluid, can react to swell and form barriers or other suitable types of sealants in the wellbore 100. For example, a wellbore barrier (e.g., a packer) can be prepared with the cured polymer and can be exposed (e.g., via stimulation with mud, production, etc.) to hydrocarbon fluid in the wellbore 100. In response to being exposed to the hydrocarbon fluid, the cured polymer may react and expand radially outward or in other suitable directions for contacting the casing 104 or the subterranean formation 108 to form one or more seals in the wellbore 100.

The cured polymer can be prepared in various fashions. For example, the cured polymer can be positioned on the wellbore barriers 102a-b and can contact a rubber or otherwise elastomeric material on the casing 104 for forming the seal in the wellbore 100. In another example, the cured polymer can be positioned within an elastomeric sealing element of the wellbore barriers 102a-b and, in response to being exposed to wellbore fluid, can expand and cause the elastomeric sealing element to expand radially outward (or in other suitable directions) to form the seal in the wellbore 100. In yet another example, the cured polymer can be positioned in a cement or cementing slurry wellbore barrier and can be activated or otherwise swelled to repair cracks, shrinkage, or other defects in the wellbore barrier 102. For example, a flow path through the wellbore barrier 102 can be shut off or otherwise blocked, one or more voids or microcracks in the wellbore barrier 102 can be self-healed, damage to the wellbore barrier 102 sustained from wellbore operations can be repaired, etc. using the cured polymer. The voids or micro-cracks can include micro-annular gaps, stress-cracking, or other suitable damage or defects in the wellbore barrier 102.

The cured polymer can be prepared using various processes. For example, the polymer or elastomer can be combined with the catalyst, for example within a mixing device at the surface 106 of the wellbore 100, and can be pumped into the wellbore 100 from the mixing device while being mixed or otherwise combined (e.g., on-the-fly mixing). This on-the-fly mixing can be used, for example, with respect to a wellbore barrier 102 including cement or a cementing slurry. In another example, the polymer or elastomer can be combined and cured prior to (e.g., via batch mixing) positioning the cured polymer in the wellbore 100. This batch mixing of the cured polymer can be used, for example, with respect to a packer or other similar type of wellbore barrier 102.

Figure 2:
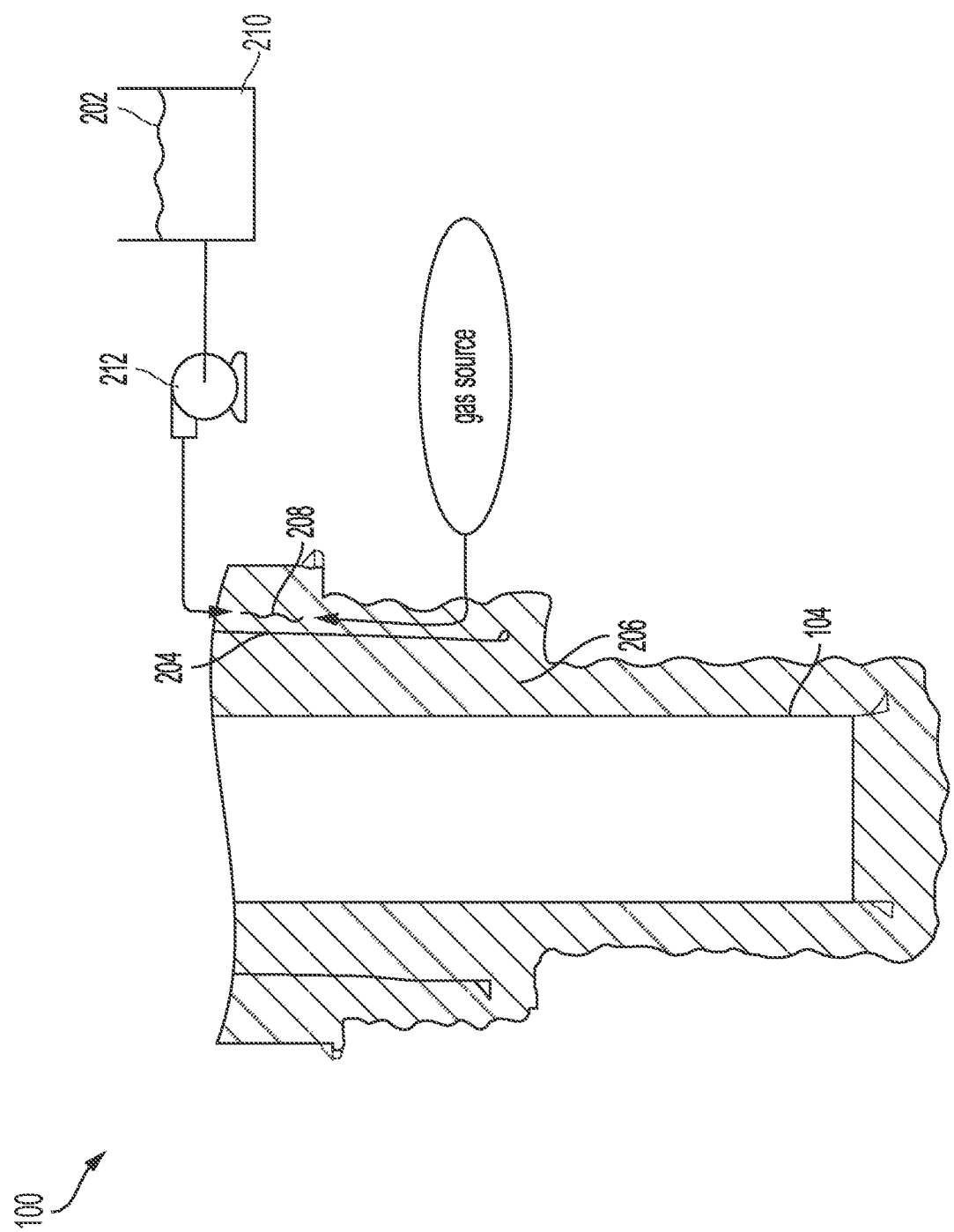
FIG. 2 is a diagram of an exemplary placement of a polymer-based sealant composition in a wellbore according to one example of the present disclosure.

FIG. 2 is a diagram of an exemplary placement of a polymer-based sealant composition 202 in a wellbore 100 according to one example of the present disclosure. As illustrated in FIG. 2, the wellbore 100 may include one or more conduits 204 disposed in the wellbore 100, supported and positioned in the wellbore 100 by a cement sheath 206. Additionally as illustrated in FIG. 2, a defect 208 may cause gas or other suitable material to propagate through cracks in the casing 104, the cement sheath 206, or a combination thereof. The polymer-based sealant composition 202 may be prepared at the surface 106 in a vessel 210 and introduced into the wellbore 100 by a pump 212, or other suitable component, to stop gas migration. The polymer-based sealant composition 202 may be pumped into the wellbore 100 directly into one of the annuli of the wellbore 100 such as annuli surrounding, the central casing, production tubing, control lines, tubing containing and fiber optic filament, or other suitable channels of the wellbore 100.

Figure 3:
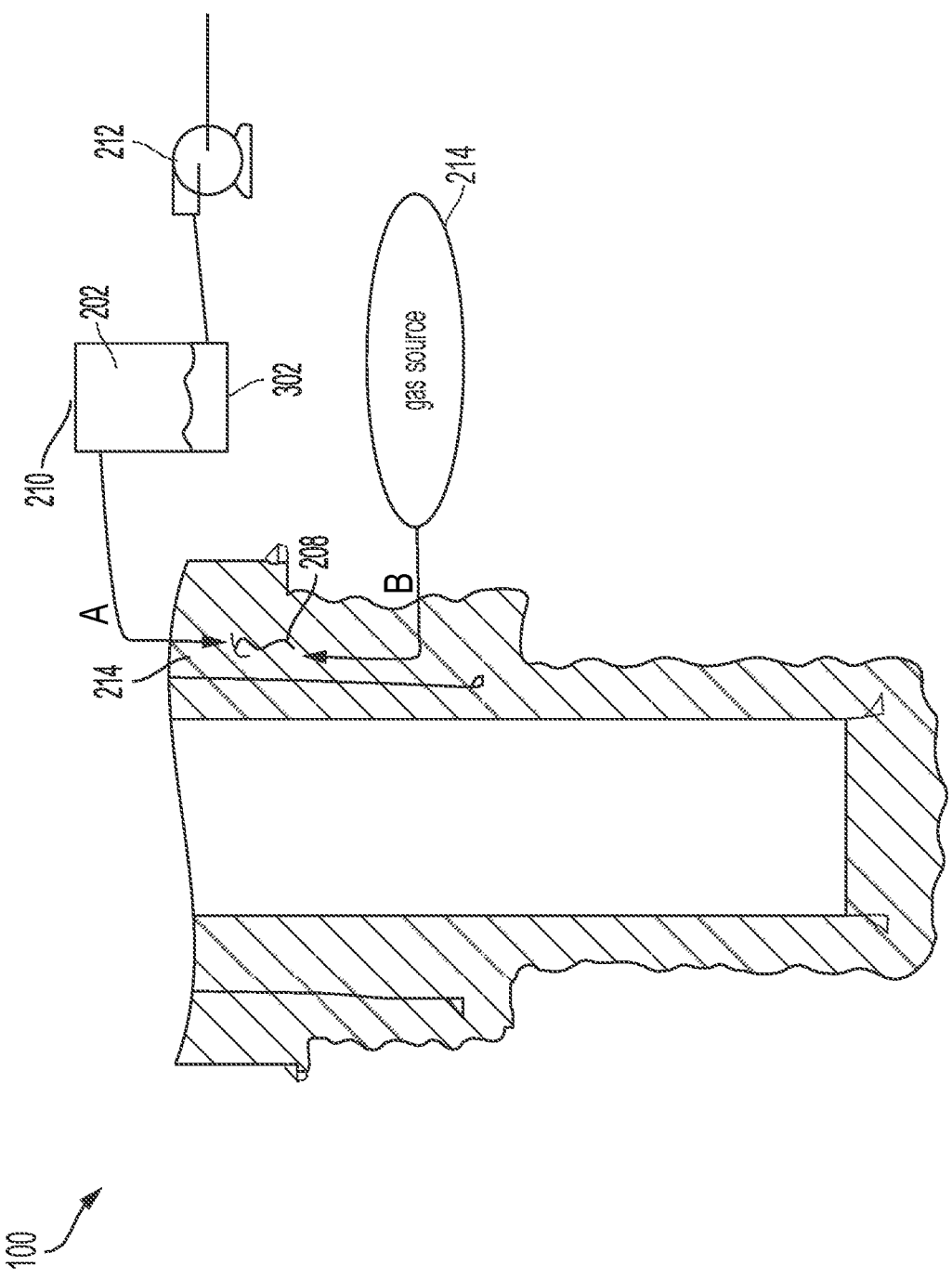
FIG. 3 is a diagram of an exemplary placement of a polymer-based sealant composition into a wellbore according to one example of the present disclosure.

FIG. 3 is a diagram of an exemplary placement of a polymer-based sealant composition 202 into a wellbore 100 according to one example of the present disclosure. As illustrated in FIG. 3, the polymer-based sealant composition 202 (e.g., a polymer or elastomer and transition metal compound catalyst) may be mixed and placed in the vessel 210 prior to introduction into the wellbore 100. The vessel 210 may be connected to one of the annuli of the wellbore 100 as depicted by arrow A, such as annuli surrounding the central casing, production tubing, control lines, tubing containing the fiber optic filament, or a combination thereof. Pressure may be applied to the vessel 210 by the pump 212 to cause the polymer-based sealant composition 202 to be positioned in an annulus 214 of the wellbore 100 to mitigate or otherwise repair the defect 208. If a displacement fluid 302 is heavier than the polymer-based sealant composition 202, the displacement fluid 302 can be pumped into the bottom of the vessel 210 to cause the polymer-based sealant composition 202 to be displaced out of the top etc. The vessel 210 may be a closed ended pipe with ports for fluid entry and exit and may be disposable. Other examples of the vessel 210 can be used with the polymer-based sealant composition 202. Additionally, as illustrated in FIG. 3, a defect 208 may cause gas or other suitable material to propagate through cracks in the casing 104, the cement sheath 206, or a combination thereof, such as from a gas source 214, as shown by arrow B.

Figure 4B:
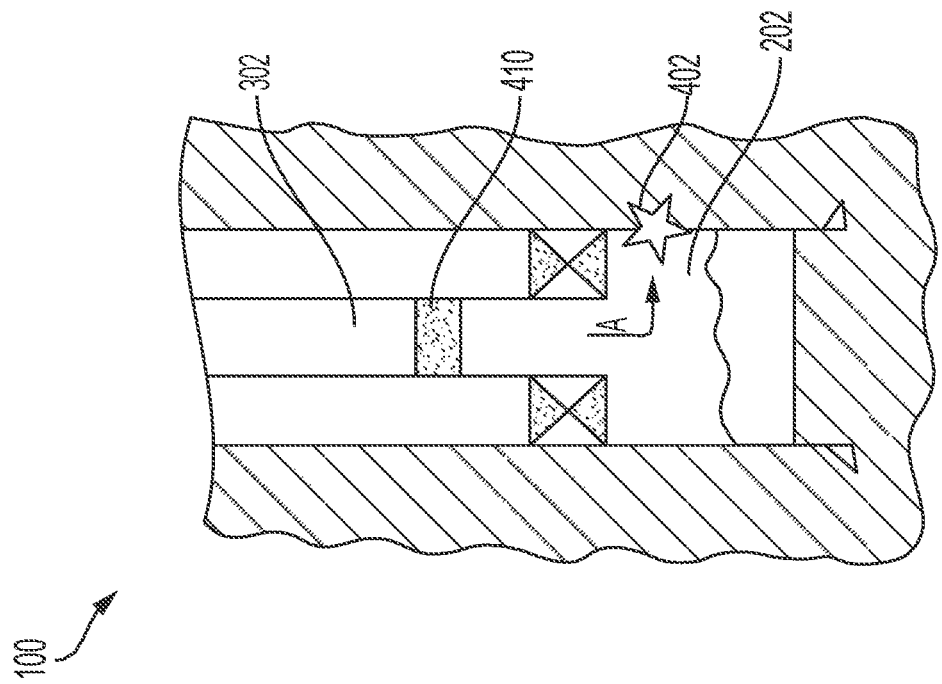
FIG. 4B is a schematic view that illustrates placement of a polymer-based sealant in a wellbore according to one example of the present disclosure.
Figure 4A:
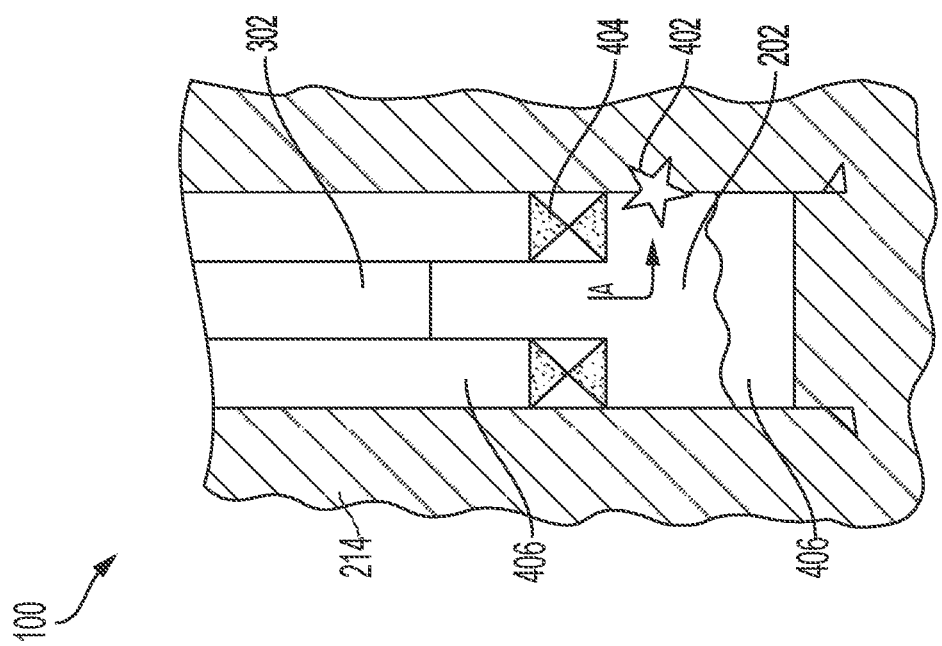
FIG. 4A is a schematic view that illustrates placement of a polymer-based sealant in a wellbore according to one example of the present disclosure

FIG. 4A and FIG. 4B are diagrams of exemplary placements of a polymer-based sealant composition 202 in the wellbore 100 according to one example of the present disclosure. As illustrated in FIG. 4A and FIG. 4B, the polymer-based sealant composition 202 may be used to seal a defect 402 in the wellbore 100. Additionally as illustrated in FIG. 4A and FIG. 4B, a retainer 404 may be set in the wellbore 100 above the defect 402 to isolate the annulus and the defect 402. Wellbore fluid 406 may be present or otherwise introduced in the wellbore 100. In some examples, the wellbore fluid 406 may be characterized by a density higher than the polymer-based sealant composition 202. In such examples, the polymer-based sealant composition 202 may be spotted or otherwise cured to the end of a work string in the wellbore 100 to a volume below the retainer 404. After spotting or curing the polymer-based sealant composition 202 below the retainer 404, the polymer-based sealant composition 202 may be further displaced by the displacement fluid 302 into the defect 402 by application of pressure, for example, by a surface pump (as shown by the directional arrows, A). If no mechanical separation exists between the displacement fluid 302 and the polymer-based sealant composition 202, the displacement fluid 302 may include a lower density than the polymer-based sealant composition 202. FIG. 4B illustrates an example in which the polymer-based sealant composition 202 includes a lower density than the density of the displacement fluid 302, in which a plug 410 may be disposed between the displacement fluid 302 and the polymer-based sealant composition 202.

Figure 5:
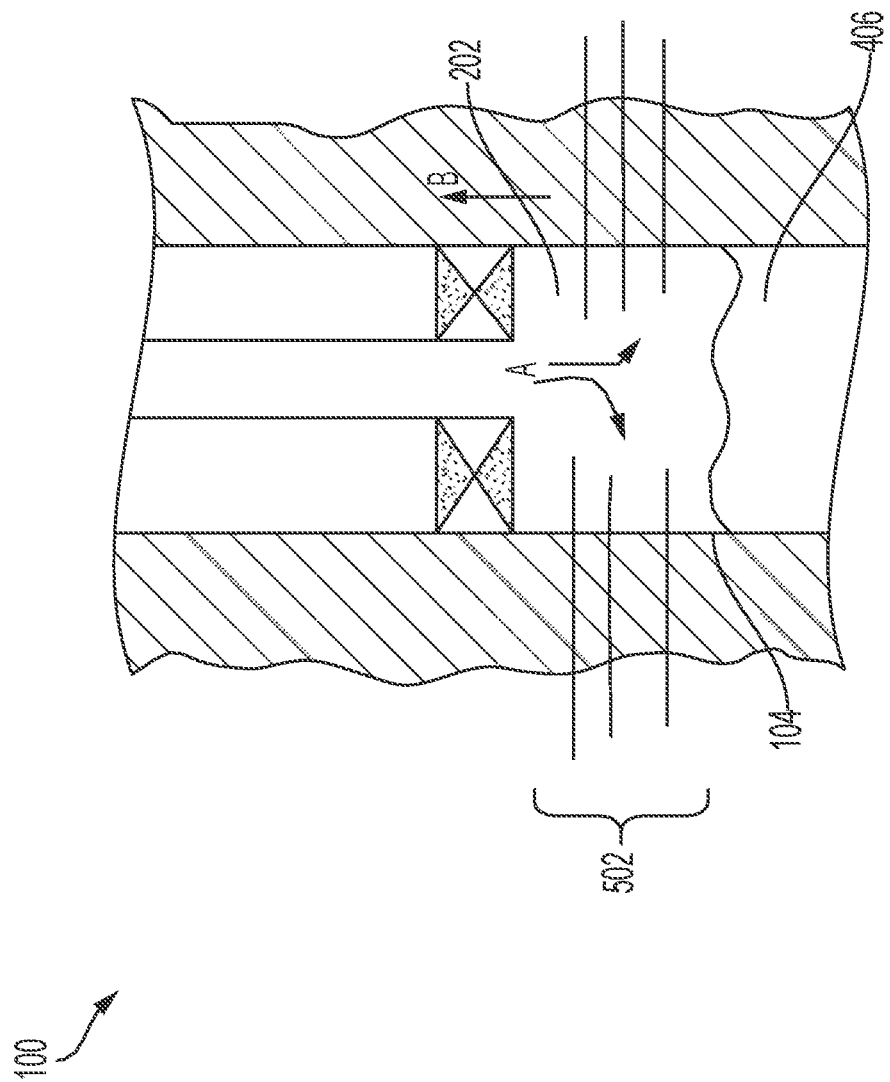
FIG. 5 is a diagram of an exemplary placement of a polymer-based sealant composition in a wellbore during sustained pressure operations according to one example of the present disclosure.

FIG. 5 is a diagram of an exemplary placement of a polymer-based sealant composition 202 in a wellbore 100 during sustained pressure operations according to one example of the present disclosure. The sustained pressure operations can include hydraulic fracturing, sand control, consolidation, gravel packing, or other similar or suitable wellbore operations. In some examples, the sustained pressure operations can involve sustained casing pressure that can result from formation fluids, gases, or liquids flowing to the surface. The related pressure can be exhibited as a well abnormality, for example, at the well head of the wellbore 100. To address pressure at the well head (or other suitable or related well abnormalities), the casing 104 can be perforated to produce an opening 502 to access a flow path (as shown by arrow B) behind the casing 104, and a resin, a polymer, or other suitable sealant can be pumped into, or otherwise positioned in, the flow path (as shown by arrow B) via the perforations or via other suitable path. In some examples, this technique may be used when the wellbore fluid includes a density that is higher than the density of the polymer-based sealant (e.g., bull-heading) or in other suitable examples. As illustrated in FIG. 5, the polymer-based sealant composition 202 can flow into an opening 502 as shown by arrows A. The opening 502 may include perforations, vugs, punches, section-milled windows with intersecting fluid flow paths behind the casing 104, or other suitable or similar openings 502 in the wellbore 100. The wellbore 100 may be isolated by one or more wellbore barriers 102.

FIG. 6A and FIG. 6B are diagrams of alternative exemplary placements of a polymer-based sealant composition 202 in a wellbore 100 according to one example of the present disclosure. The polymer-based sealant composition 202 may be placed as a balanced plug 602 into the wellbore 100 with a defect 604 such as a casing leak for sustained casing pressure, etc. The balanced plug 602, which may include a hardened polymer-based sealant composition 202, may provide pressure isolation to treat the defect 604. While not shown, the polymer-based sealant composition 202 may be placed using a pump and pull method in which a work string can be used to place the polymer-based sealant composition 202 into the wellbore 100, as shown by arrow A, and into the defect 604 (as shown by arrows B). As shown in FIG. 6B, the working string may be removed from the wellbore 100.

Figure 7A:
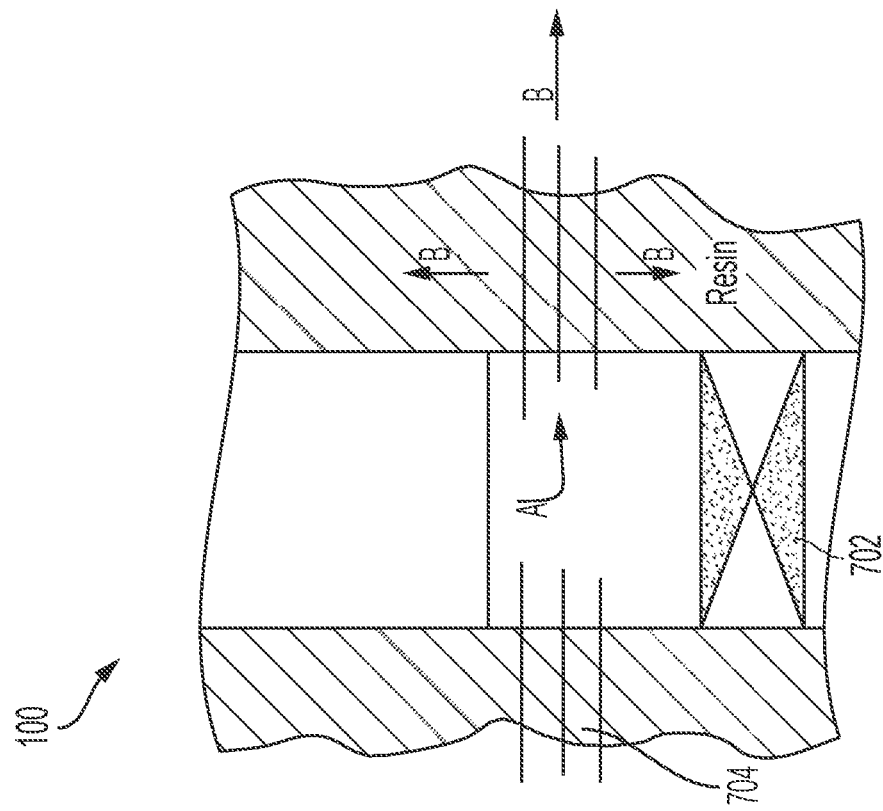
FIG. 7A is a diagram of an alternative exemplary placement of a polymer-based sealant composition in a wellbore according to one example of the present disclosure.
Figure 7B:
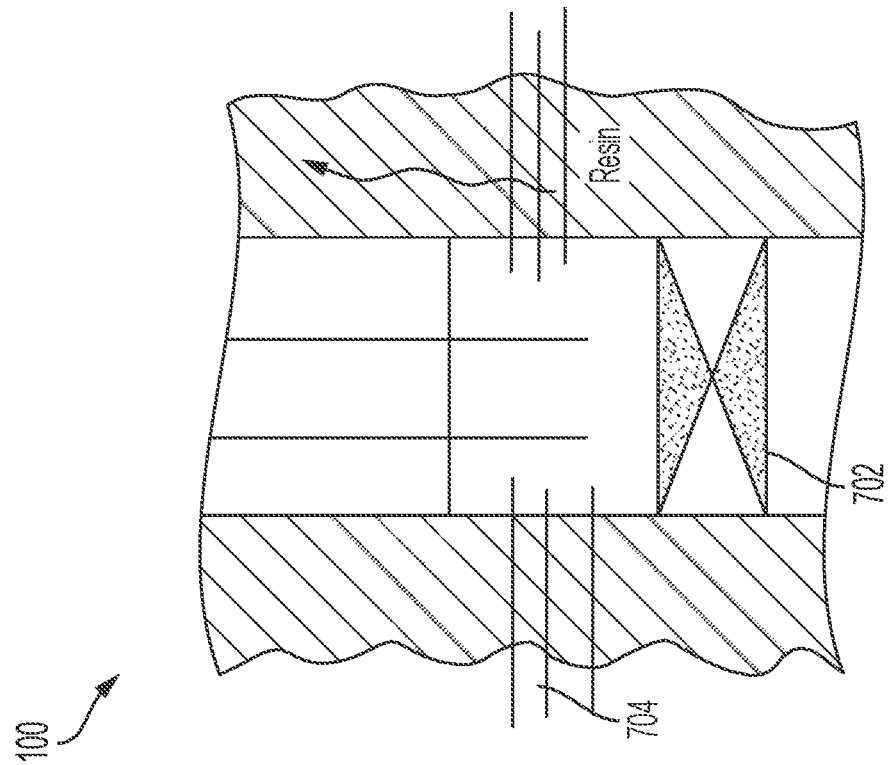
FIG. 7B is a diagram of an alternative exemplary placement of a polymer-based sealant composition in a wellbore according to one example of the present disclosure.

FIG. 7A and FIG. 7B are diagrams of alternative exemplary placements of a polymer-based sealant composition 202 in a wellbore 100 according to one example of the present disclosure. The polymer-based sealant composition 202 may be placed as balanced plug 702 into the wellbore 100 with gas migration from perforations 704. The balanced plug 702, which may include a hardened polymer-based sealant composition 202, may provide pressure isolation to treat gas migration, and the like. While not shown, the polymer-based sealant composition 202 may be placed using a pump and pull method in which a work string can be used to place the polymer-based sealant composition 202 in the wellbore 100, as shown by arrow A. In some examples, resin may be flowed in the annulus or other suitable location in the wellbore 100 to shut off formation gas flowing from perforations 704 along the wellbore 100, as shown by the arrows B.

Figure 8:
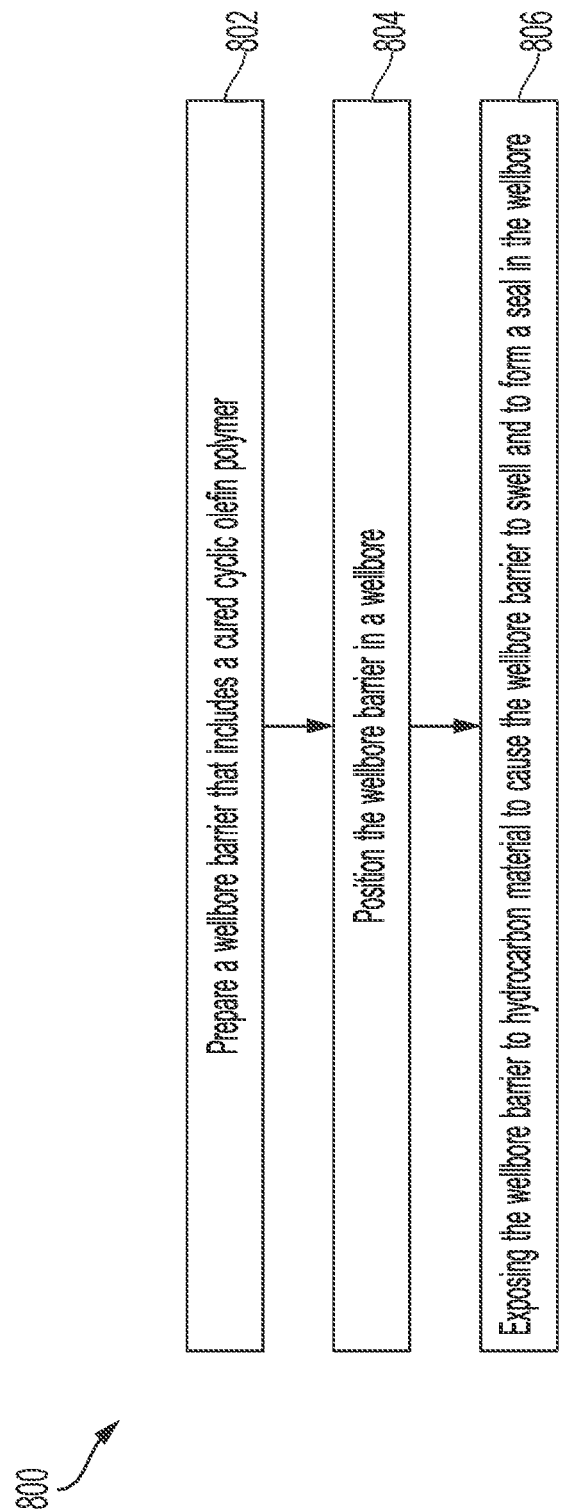
FIG. 8 is a flowchart of a process to prepare and use a wellbore barrier to form a seal in a wellbore according to one example of the present disclosure.

FIG. 8 is a flowchart of a process 800 to prepare and use a wellbore barrier 102 to form a seal in a wellbore 100 according to one example of the present disclosure. At block 802, a wellbore barrier 102 that includes a cured polymer 115 is prepared. The wellbore barrier 102 can include a wellbore packer, a cementing slurry or cementitious solution, other suitable wellbore barrier, or a combination thereof. The cured polymer 115 can include a polymeric material, a catalytic material, and other suitable components for the cured polymer 115.

The cured polymer 115 may be positioned within the wellbore barrier 102 (e.g., for the cement slurry) or may be positioned on the wellbore barrier 102 (e.g., for the wellbore packer). In examples in which the wellbore barrier 102 is the wellbore packer, the cured polymer 115 may be positioned within an elastomeric sealing element that may be positioned on an exterior surface of the wellbore barrier 102. Alternatively, the cured polymer 115 can be positioned on an exterior surface of the wellbore barrier 102.

The cured polymer 115 may be prepared using various processes. For example, components (e.g., the polymeric material, the catalytic material, etc.) of the cured polymer 115 may be batch-mixed in which the components are combined to form the cured polymer 115 prior to the cured polymer 115 being positioned with respect to the wellbore barrier 102. In some examples, batch-mixed cured polymer 115 may be used for cured polymer 115 positioned on a wellbore packer or other similar wellbore barrier 102. In other examples, the components of the cured polymer 115 can be combined to form the cured polymer 115 while the cured polymer 115 is being positioned with respect to the wellbore barrier 102. This on-the-fly mixing of the cured polymer 115 may be used in examples in which the wellbore barrier 102 is a cement or cementitious slurry.

At block 804, the wellbore barrier 102 is positioned in a wellbore 100. The wellbore 100 can be an open-hole wellbore or other suitable type of wellbore 100 for performing wellbore operations. In examples in which the wellbore barrier 102 is a cement, cementitious slurry, or the like, the wellbore barrier 102 may be pumped downhole in the wellbore 100. In other examples, the wellbore barrier 102 (e.g., the wellbore packer) may be positioned in the wellbore 100 using a tool string or other suitable component. The wellbore barrier 102 can be positioned in the wellbore 100 via any other suitable processes.

At block 806, the cured polymer 115 is exposed to hydrocarbon material in the wellbore 100. In response to being exposed to the hydrocarbon material, the cured polymer 115 can undergo a chemical reaction and can swell in-situ or otherwise expand. The cured polymer 115 can expand over a period of time (e.g., hours, days, weeks, etc.) to cause the wellbore barrier 102 to form one or more seals or wellbore sealants in the wellbore 100.

In some examples, the cured polymer 115 may be positioned in the elastomeric sealing element of the wellbore barrier 102. In such examples, the cured polymer 115 may expand and may cause the elastomeric sealing element of the wellbore barrier 102 to contact a wall or the casing 104 of the wellbore 100. By contacting the wall or the casing 104, the elastomeric sealing element may form the wellbore sealant or seal in the wellbore 100. In other examples, the cured polymer 115 may be positioned on an exterior surface of the wellbore barrier 102, and, in response to being exposed to the hydrocarbon material, the cured polymer 115 can expand and can contact, or cause the wellbore barrier 102 to contact, a portion of the casing 104 for forming a seal in the wellbore 100. In yet other examples, the cured polymer 115 can be dispersed in a cement or cementitious slurry and can expand, in response to being exposed to the hydrocarbon material, to repair a defect in the wellbore 100.

Figure 9:
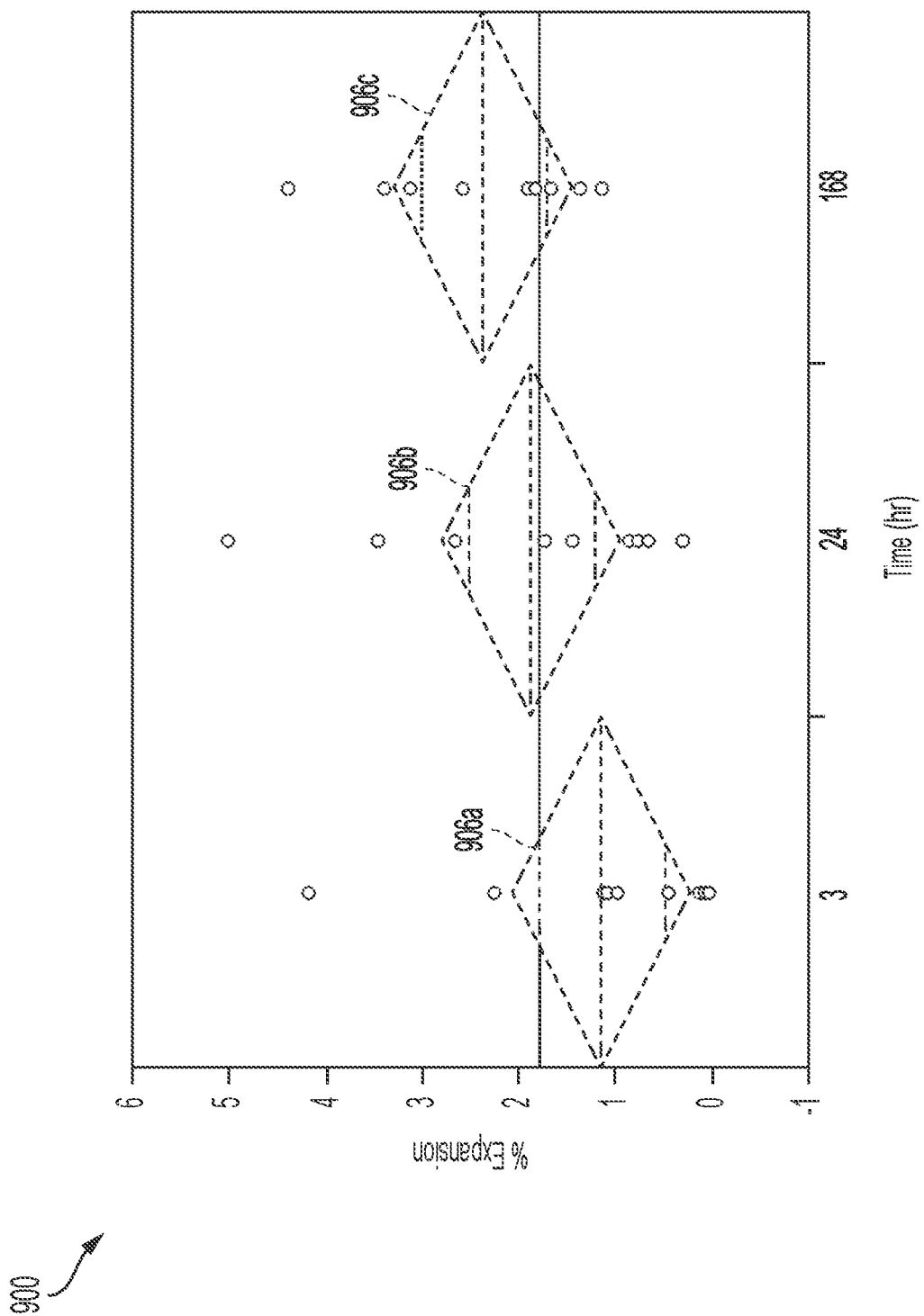
FIG. 9 is a plot of expansion versus time for a wellbore barrier that includes a cured polymer according to one example of the present disclosure.

FIG. 9 is a plot 900 of expansion versus time for a wellbore barrier 102 that includes a cured polymer 115 according to one example of the present disclosure. As illustrated, the plot 900 includes a horizontal axis 902 that represents time elapsed from a starting time and a vertical axis 904 that represents expansion from a starting volume. The horizontal axis 902 may include units of time (e.g., hours), and the vertical axis 904 may include a unit-less measure (e.g., a percentage of expansion increase over the starting volume). The starting time may include a time at which the cured polymer is exposed to hydrocarbon material for causing a wellbore barrier 102 to expand to form a wellbore sealant. The starting volume may include a volume of the wellbore barrier 102 in a compressed configuration and before expanding into an expanded configuration.

The plot can additionally include a set of diamonds 906a-c that may represent data points at discrete time intervals. For example, the diamond 906a may represent data points at three hours after the starting time, the diamond 906b may represent data points at 24 hours after the starting time, and the diamond 906c may represent data points at 168 hours after the starting time. Each diamond 906a-c may represent various percentile values of expansion data at the respective discrete time interval. For example, the diamond 906a may represent a 25th percentile to a 75th percentile value of expansion of the cured polymer after three hours of expansion. Other measures are possible with respect to the diamonds 906a-c. As illustrated in the plot 900, expansion of the cured polymer may begin within a few hours of exposure of the cured polymer to hydrocarbon (or other suitable) material, and significant expansion (e.g., more than two percent by volume) can be realized by the cured polymer after 168 hours or even after just 24 hours.

In some aspects, devices, methods, and assemblies for in-situ swelling polymer for wellbore barrier are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a device comprising: a wellbore barrier positionable in a wellbore; and a cured polymer positionable with respect to the wellbore barrier for swelling the device in-situ from a compressed configuration to a swelled configuration for forming one or more wellbore sealants in the wellbore.

Example 2 is the device of example 1, wherein the cured polymer comprises: a polymeric material positionable on or within the wellbore barrier; and a catalytic material positionable on or within the wellbore barrier, wherein the polymeric material and the catalytic material are combinable to form the cured polymer.

Example 3 is the device of any of examples 1-2, wherein the polymeric material includes one or more cyclic olefins and wherein the catalytic material includes a transition metal compound.

Example 4 is the device of any of examples 1-2, wherein the cured polymer is formable: by batch-mixing the polymeric material and the catalytic material in which the polymeric material and the catalytic material are combined to form the cured polymer prior to positioning the cured polymer with respect to the wellbore barrier; and by mixing the polymeric material and the catalytic material to form the cured polymer while the cured polymer is being positioned with respect to the wellbore barrier.

Example 5 is the device of example 1, wherein the wellbore barrier includes a wellbore packer, wherein the cured polymer is positionable on the wellbore packer within an elastomeric sealing element, and wherein the cured polymer is expandable, in response to being exposed to hydrocarbon material, to cause the elastomeric sealing element to expand to form the one or more wellbore sealants in the wellbore.

Example 6 is the device of example 1, wherein the wellbore barrier includes a wellbore packer, wherein the cured polymer is positionable on an exterior surface of the wellbore packer, and wherein the cured polymer is expandable, in response to being exposed to hydrocarbon material, to contact a casing or wall of the wellbore to form the one or more wellbore sealants in the wellbore.

Example 7 is the device of example 1, wherein the wellbore barrier includes a cement slurry, wherein the cured polymer is positionable within the cement slurry, and wherein the cured polymer is expandable, in response to being exposed to hydrocarbon material, within the cement slurry for repairing one or more defects in the cement slurry subsequent to the cement slurry being set.

Example 8 is a method comprising: preparing a wellbore barrier that includes a cured polymer; positioning the wellbore barrier in a wellbore; and exposing the cured polymer to hydrocarbon material to cause the wellbore barrier to swell in-situ and to form one or more seals in the wellbore.

Example 9 is the method of example 8, wherein the cured polymer comprises: a polymeric material positioned on or within the wellbore barrier; and a catalytic material positioned on or within the wellbore barrier, wherein the polymeric material and the catalytic material are combined to form the cured polymer.

Example 10 is the method of any of examples 8-9, wherein the polymeric material includes one or more cyclic olefins and wherein the catalytic material includes a transition metal compound.

Example 11 is the method of any of examples 8-9, wherein preparing the wellbore barrier that includes the cured polymer includes forming the cured polymer: by batch-mixing the polymeric material and the catalytic material in which the polymeric material and the catalytic material are combined to form the cured polymer prior to positioning the cured polymer with respect to the wellbore barrier; or by mixing the polymeric material and the catalytic material to form the cured polymer while the cured polymer is being positioned with respect to the wellbore barrier.

Example 12 is the method of example 8, wherein the wellbore barrier includes a wellbore packer, wherein the cured polymer is positioned on the wellbore packer within an elastomeric sealing element, and wherein exposing the cured polymer to hydrocarbon material includes exposing the cured polymer to the hydrocarbon material to cause the elastomeric sealing element to expand to form the one or more seals in the wellbore.

Example 13 is the method of example 8, wherein the wellbore barrier includes a wellbore packer, wherein the cured polymer is positioned on an exterior surface of the wellbore packer, and wherein exposing the cured polymer to hydrocarbon material includes exposing the cured polymer to the hydrocarbon material to cause the wellbore barrier to contact a casing or wall of the wellbore to form the one or more seals in the wellbore.

Example 14 is the method of example 8, wherein the wellbore barrier includes a cement slurry, wherein the cured polymer is positioned within the cement slurry, and wherein exposing the cured polymer to hydrocarbon material includes exposing the cured polymer to hydrocarbon material within the cement slurry for repairing one or more defects in the cement slurry subsequent to the cement slurry being set.

Example 15 is an assembly comprising: a wellbore barrier positionable in a wellbore; a polymeric material positionable on or within the wellbore barrier; and a catalytic material positionable on or within the wellbore barrier and combinable with the polymeric material to form a cured polymer that is swellable to cause the assembly to in-situ-form one or more seals in the wellbore.

Example 16 is the assembly of example 15, wherein the polymeric material includes one or more cyclic olefins and wherein the catalytic material includes a transition metal compound.

Example 17 is the assembly of example 15, wherein the polymeric material and the catalytic material are combinable to form the cured polymer: by batch-mixing the polymeric material and the catalytic material in which the polymeric material and the catalytic material are combined to form the cured polymer prior to positioning the cured polymer with respect to the wellbore barrier; and by mixing the polymeric material and the catalytic material to form the cured polymer while the cured polymer is being positioned with respect to the wellbore barrier.

Example 18 is the assembly of example 15, wherein the wellbore barrier includes a wellbore packer, wherein the polymeric material and the catalytic material are positionable on the wellbore packer within an elastomeric sealing element to form the cured polymer, and wherein the cured polymer is expandable, in response to being exposed to hydrocarbon material, to cause the elastomeric sealing element to expand to form the one or more wellbore sealants in the wellbore.

Example 19 is the assembly of example 15, wherein the wellbore barrier includes a wellbore packer, wherein the polymeric material and the catalytic material are positionable on an exterior surface of the wellbore packer to form the cured polymer, and wherein the cured polymer is expandable, in response to being exposed to hydrocarbon material, to contact a casing or wall of the wellbore to form the one or more wellbore sealants in the wellbore.

Example 20 is the assembly of example 15, wherein the wellbore barrier includes a cement slurry, wherein the polymeric material and the catalytic material are positionable within the cement slurry to form the cured polymer, and wherein the cured polymer is expandable, in response to being exposed to hydrocarbon material, within the cement slurry for repairing one or more defects in the cement slurry subsequent to the cement slurry being set.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A device comprising:
a polymeric wellbore barrier positioned on a casing, the casing configured for positioning in a wellbore;
wherein the polymeric wellbore barrier comprises a cured polymer including a resin and a transition metal compound catalyst, wherein the resin comprises one or more cyclic olefins, wherein the transition metal compound catalyst comprises a structure selected from the group consisting of:

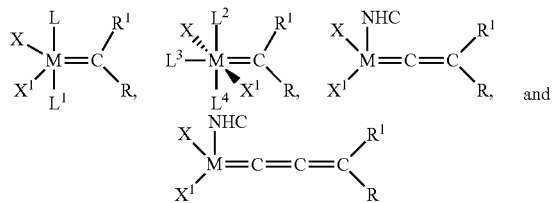

wherein M is ruthenium or osmium, wherein R and $R^1$ are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, wherein X and $X^1$ independently comprise an anionic ligand, wherein L, $L^1$, $L^2$, $L^3$, and $L^4$ independently comprise a neutral electron donor, and wherein NHC is an N-heterocyclic carbene ligand, and wherein the polymeric wellbore barrier is configured to harden in the wellbore and swell in-situ in the wellbore upon contact with a hydrocarbon material to form a seal against the casing in the wellbore, wherein the polymeric wellbore barrier swells by more than 2% by volume upon contact with the hydrocarbon material, wherein the polymeric wellbore barrier is a secondary barrier to a primary cementing barrier.

2. The device of claim 1, wherein the polymeric wellbore barrier is positioned on an outside of the casing between the casing and the primary cementing barrier.

3. The device of claim 1, wherein the resin comprises one or more alkadienes selected from the group consisting of cyclopentadiene, pentadiene, cyclobutadiene, cyclobutadiene derivatives, cyclohexadiene, terpinene, norbornadiene, isomers thereof, and combinations thereof, and wherein the resin and the transition metal compound catalyst are reactable in a ring-opening metathesis polymerization (ROMP) reaction to form the cured polymer.

4. The device of claim 1, wherein the resin and the transition metal compound catalyst are present in the cured polymer with a mass ratio of about 50:1 to about 10000:1 of the resin to the transition metal compound catalyst.

5. The device of claim 1, wherein the resin and the transition metal compound catalyst are configured to be cured prior to the casing being positioned in the wellbore, and wherein the polymeric wellbore barrier composition is pumpable at a temperature below 38° C.

6. The device of claim 1, wherein the resin and the transition metal compound catalyst are configured to be cured subsequent to the casing being positioned in the wellbore, and wherein the polymeric wellbore barrier composition is pumpable at a temperature below 38° C.

7. A method comprising:
placing a polymeric wellbore barrier adjacent to a casing to in a wellbore, wherein the polymeric wellbore barrier comprises a cured polymer including a resin and a transition metal compound catalyst, wherein the resin comprises one or more cyclic olefins, and wherein the transition metal compound catalyst comprises a catalyst having a structure selected from the group consisting of:

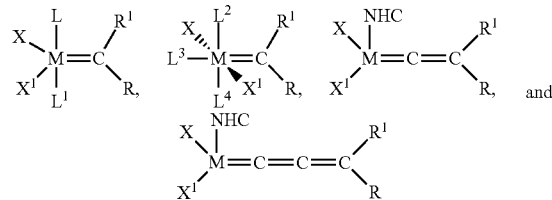

wherein M is ruthenium or osmium, wherein R and $R^1$ are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, wherein X and X' independently comprise an anionic ligand, and wherein L, $L^1$, $L^2$, $L^3$, and $L^4$ independently comprise a neutral electron donor, and wherein NHC is an N-heterocyclic carbene ligand;
wherein the polymeric wellbore barrier hardens in the wellbore adjacent to the casing; and
exposing the polymeric wellbore barrier to hydrocarbon material to cause the polymeric wellbore barrier to swell in-situ and form a seal against the casing in the wellbore, wherein the polymeric wellbore barrier swells by more than 2% by volume upon contact with the hydrocarbon material, wherein the polymeric wellbore barrier is a secondary barrier to a primary cementing barrier.

8. The method of claim 7, wherein the polymeric wellbore barrier is positioned on an outside of the casing between the casing and the primary cementing barrier.

9. The method of claim 7, wherein the resin comprises one or more alkadienes selected from the group consisting of cyclopentadiene, pentadiene, cyclobutadiene, cyclobutadiene derivatives, cyclohexadiene, terpinene, norbornadiene, isomers thereof, and combinations thereof, and wherein the resin and the transition metal compound catalyst react in a ring-opening metathesis polymerization (ROMP) to form the cured polymer.

10. The method of claim 7, wherein the resin and the transition metal compound catalyst are present in the cured polymer with a mass ratio of about 50:1 to about 10000:1 of the resin to the transition metal compound catalyst.

11. The method of claim 7, wherein the resin and the transition metal compound catalyst are configured to be cured prior to the casing being positioned in the wellbore, and wherein the polymeric wellbore barrier composition is pumpable below 38° C.

12. The method of claim 7, wherein the resin and the transition metal compound catalyst are configured to be cured subsequent to the casing being positioned in the wellbore, and wherein the polymeric wellbore barrier composition is pumpable below 38° C.

13. An assembly comprising:
a polymeric wellbore barrier; and
a casing configured for positioning in a wellbore, wherein the polymeric wellbore barrier is molded to the casing, wherein the polymeric wellbore barrier is configured to swell in-situ upon contact with a hydrocarbon material in the wellbore and form a seal against the casing in the wellbore, wherein the polymeric wellbore barrier swells by more than 2% by volume upon contact with the hydrocarbon material, wherein the polymeric wellbore barrier is a secondary barrier to a primary cementing barrier, and wherein the polymeric wellbore barrier comprises a cured polymer including a resin and a transition metal compound catalyst, wherein the resin comprises one or more cyclic olefins, wherein the transition metal compound catalyst comprises a catalyst having a structure selected from the group consisting of:

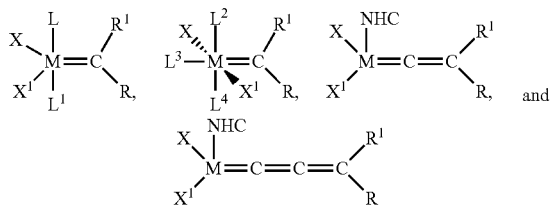

wherein M is ruthenium or osmium, wherein R and $R^1$ are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, wherein X and X' independently comprise an anionic ligand, and wherein L, $L^1$, $L^2$, $L^3$, and $L^4$ independently comprise a neutral electron donor, and wherein NHC is an N-heterocyclic carbene ligand.

14. The assembly of claim 13, further comprising cured cement between the casing and the wellbore, wherein the polymeric wellbore barrier forms the seal between the casing and the cured cement, wherein the polymeric wellbore barrier composition is pumpable below 38° C.

15. The assembly of claim 13, wherein the resin comprises one or more alkadienes selected from the group consisting of cyclopentadiene, pentadiene, cyclobutadiene, cyclobutadiene derivatives, cyclohexadiene, terpinene, norbornadiene, isomers thereof and combinations thereof, and wherein the one or more cyclic olefins and the transition metal compound catalyst are reacted in a ring-opening metathesis polymerization (ROMP) reaction to form the cured polymer.

16. The assembly of claim 13, wherein the resin and the transition metal compound catalyst are present in the cured polymer with a mass ratio of about 50:1 to about 10000:1 of the resin to the transition metal compound catalyst.

17. The assembly of claim 13, further comprising cured cement between the casing and the wellbore and wherein the polymeric wellbore barrier is configured to harden in the wellbore and swell in-situ in the wellbore upon contact with a hydrocarbon to form the seal between the casing and the cured cement, wherein the polymeric wellbore barrier composition is pumpable below 38° C.

* * * * *